United States Patent Office 3,663,661
Patented May 16, 1972

3,663,661
RUBBER MODIFIED POLYPHENYLENE ETHER AND PROCESS
Arthur Katchman, Delmar, N.Y., assignor to General Electric Company
No Drawing. Filed Mar. 9, 1970, Ser. No. 17,940
Int. Cl. C08f 29/12, 41/12
U.S. Cl. 260—892
20 Claims

ABSTRACT OF THE DISCLOSURE

This invention relates to rubber modified polyphenylene ether compositions and to a method for forming the same. The method comprises polymerizing a monomeric phenol to a high molecular weight polyphenylene ether in a reaction medium containing solvated rubber and recovering polymeric components from solution in the form of a precipitate by admixture of said reaction medium with a non-solvent precipitant. After drying, the recovered precipitate comprises a free flowing powder consisting of the polyphenylene ether and the rubber which powder is suitable for molding operations such as extrusion, cold forming and the like.

BACKGROUND OF THE INVENTION

(1) Introduction

This invention relates to mixed synthetic resins and more particularly, to a rubber modified polyphenylene ether composition and a process for forming the same.

(2) Description of the prior art

The polyphenylene ethers are known and described in numerous publications including U.S. Pats. Nos. 3,306,874 and 3,306,875 of Allan S. Hay and U.S. Pats. Nos. 3,257,357 and 3,257,358 of Gelu Stoeff Stamatoff. The high molecular weight polyphenylene ethers are high performance engineering thermoplastics possessing relatively high melt viscosities and softening points, i.e., in excess of 275° C., and are useful for many commercial applications requiring high temperature resistance including formation of film, fiber and molded articles.

While possessing the above described desirable properties, it is also known that certain of the properties of the polyphenylene ethers are undesirable for some commercial uses. For example, parts molded from polyphenylene ethers are somewhat brittle due to poor impact strength. In addition, the relatively high melt viscosities and softening points are considered a disadvantage for many uses. Film and fiber can be formed from a polyphenylene ether on a commercial scale using solution techniques, but melt processing is commercially unattractive because of the required high temperatures needed to soften the polymer and the problem associated therewith such as instability, discoloration and a requirement for specially designed process equipment to operate at elevated temperatures. Molded articles can be formed by melt processing techniques, but again, the high temperatures required are undesirable.

It is known in the art that the properties of the polyphenylene ethers can be materially altered by blending with other polymers. For example, one method for improving the melt-processability of the polyphenylene ethers is disclosed in commonly-assigned U.S. Pat. No. 3,379,792 incorporated herein by reference. According to this patent, flow properties of the polyphenylene ethers are improved by blending with from about 0.1 to 25 parts by weight of a polyamide. In commonly-assigned U.S. Pat. No. 3,361,851, a polyphenylene ether composition comprising a polyphenylene ether blended with a polyolefin is disclosed. The polyolefin is added to improve impact strength and resistance to aggressive solvents. In commonly-assigned U.S. Pat. No. 3,383,435, there is provided a means for simultaneously improving the melt processability of the polyphenylene ethers while simultaneously up-grading many properties of polystyrene. The invention of this patent is based upon the discovery that the polyphenylene ethers and polystyrenes, including the modified polystyrenes, are combinable in all proportions resulting in blends having many properties improved over those of either of the components.

A preferred embodiment of U.S. Pat. No. 3,383,435, is a composition comprising a high-impact, rubber reinforced polystyrene and a poly-(2,6-dialkyl-1,4-phenylene) ether. This composition is preferred because it obtains the aforementioned objectives of improving the melt processability of the polyphenylene ether and provides the further advantage of improving impact resistance of parts molded from the blend. Further, the blend of the polyphenylene ether and the high impact polystyrene may be custom formulated to provide predetermined properties ranging between those of the polystyrene and those of the polyphenylene ether by controlling the ratio of the two polymers. The reason for this is that the blend exhibits a single set of thermodynamic properties rather than two distinct sets of properties—i.e., one for each of the components of the blend as is typical with blends of the prior art.

It has been found that the impact resistance of the polyphenylene ether is improved due to the butadiene or rubber content of the high-impact polystyrene and in this respect, it has been additionally found that the improvement in impact strength is directly proportional to the butadiene content of the polystyrene. Since high impact strength is a desirable property of a molded part, an obvious method for improving impact strength further might appear to be to blend the polyphenylene ether with a rubber-modified polystyrene having a higher butadiene content. However, as a practical limitation, commercially available rubber-modified polystyrenes do not have as high a butadiene content as might be desired for this purpose. Another seemingly obvious method for increasing butadiene content would be to add polybutadiene a powder blend of the polystyrene and the polyphenylene ether prior to forming such as by extrusion into pellets. However, it has been found that due to the rubbery nature of the polybutadiene, the particles of polybutadiene tend to coalesce or aggregate during the forming operation resulting in relatively large aggregates or nodules of polybutadiene contained in the molded part. As a result, various of the physical properties of the molded part are impaired. To avoid this problem, very small particles of polybutadiene have been prepared by freezing larger, commercially available particles and grinding the frozen particles prior to blending with the polyphenylene ether and polystyrene. This is an obviously impractical method for preparing blends.

SUMMARY OF THE INVENTION

The present invention overcomes the difficulties noted above and provides a means for increasing butadiene content in a polyphenylene ether-polystyrene composition. Moreover, by practice of the present invention, both butadiene and other rubbers may be added to a polyphenylene ether, with or without other polymeric additives. The process of the subject invention comprises polymerizing a monomeric phenol to a high molecular weight polyphenylene ether in a reaction medium containing solvated rubber and recovering the polymeric components from the medium in the form of a precipitate by admixture of said solution with a non-solvent precipitant. After drying, the precipitate recovered comprises a free flowing powder consisting of the polyphenylene ether and the rubber, which powder is suitable for forming into any desired shape such as by compression molding, extrusion or the like. Thus, molded parts formed from powder blends prepared in accordance with the process of this invention are free of relatively large aggregates of the rubber.

The phenolic monomer is preferably polymerized to a high molecular weight polyphenylene ether using an oxidative coupling polymerization reaction in the presence of a copper-amine complex catalyst.

DESCRIPTION OF THE PREFERRED EMBODIMENTS

The polyphenylene ethers with which this invention is concerned are preferably those having repeating structural units of the formula

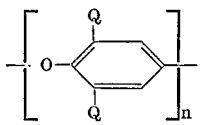

where the oxygen ether atom of one unit is connected to the benzene nucleus of the next adjoining unit, $n$ is a positive integer and is at least 100, and each Q is a monovalent substituent selected from the group consisting of hydrogen, halogen, hydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus. Examples of polyphenylene ethers corresponding to the above formula can be found in the above-referenced patents of Hay and Stamatoff. The more preferred polyphenylene ethers, for purposes of the present invention, are those having alkyl substitution in the two positions ortho to the oxygen ether atom—i.e., where each Q is alkyl, most preferably, having from one to four carbon atoms. The most preferred polyphenylene ether for purposes of the present invention is poly-(2,6 - dimethyl - 1,4 - phenylene)ether.

As noted above, the polyphenylene ethers in accordance with the invention may be used alone or in combination with an additional resin, preferably a polystyrene and most preferably a high-impact polystyrene. As disclosed in the above-noted U.S. Pat. No. 3,383,435, the styrene resin combinable with the polyphenylene ether is one having at least 25% by weight polymer units derived from a monomer having the formula:

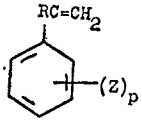

where R is hydrogen, lower alkyl or halogen; Z is a member selected from the class consisting of vinyl, hydrogen, halogen and lower alkyl; and $p$ is 0 or a whole number equal to from 1 to 5. The preferred styrene resin for purposes of this invention is one comprising polystyrene blended with from about 30 to 35% by weight polybutadiene. Lower alkyl is herein defined as having from 1 to 4 carbon atoms.

For brevity, the term "polyphenylene ether composition," as used herein, shall include within its scope, the polyphenylene ethers alone, or as blended with other resins such as the polystyrenes described above. In addition, it should be understood that the term encompasses polyphenylene ethers containing other additives as would be obvious to those skilled in the art such as stabilizers, pigments, plasticizers and the like.

In accordance with the invention, a rubber is added to the polyphenylene ether composition primarily to improve impact strength. Though polybutadiene is the rubber heretofore used in conjunction with the polyphenylene ethers (added to the composition in the form of high-impact polystyrene), the present invention makes possible the addition of substantially any rubber with a resulting improvement in impact strength, though polybutadiene still constitutes the most preferred embodiment as it appears to provide the most substantial improvements. Examples of other rubbers within the scope of this invention include modified polybutadiene such as the hydroxy and carboxy terminated polybutadienes, polychlorobutadiene known commercially as the neoprenes, polyisobutylenes including copolymers with isoprene, polyisoprene, copolymers of ethylene and propylene, copolymers of various diolefins and acrylic nitriles, thiokol rubbers, polysulfide rubbers, acrylic rubbers, polyurethanes, copolymers of butadiene or isoprene and various co-monomers such as methyl methacrylate, 3,4-dichloro-α-methyl styrene, methylisopropenyl ketone, vinyl pyridine, styrene and other related unsaturated monomers, polyether rubbers, epichlorohydrin rubbers and the like.

The amount of rubber added to the formulation is not critical to the invention, the improvement in impact strength being substantially directly proportional to the concentration of the rubber. However, dependent upon the particular rubber used, there is a maximum concentration beyond which the particles of the rubber begin to coalesce and form nodules within the molded part, thereby impairing various physical properties. A maximum of 30% by weight rubber is set forth herein for purposes of establishing a guideline, but this may vary dependent upon the rubber used as noted above. Below about 1% rubber, little improvement in impact resistance is obtained and this represents a practical minimum amount for purposes of this invention. A preferred range for the rubber varies from about 5 to 20% by weight of the blend.

Where other resins are used in conjunction with the polyphenylene ethers, such as polystyrenes or high-impact polystyrene, they are used in their customary amounts, but reduced proportionality in accordance with the amount of rubber added to the formulation. A most preferred composition in accordance with this invention comprises a polyphenylene ether in an amount of from 30 to 50% by weight, a polystyrene in an amount of from 30 to 50% and a rubber in an amount of from 5 to 20%.

As noted above, the blend of polymer and rubber is prepared by polymerizing a monomeric phenol to a high molecular weight polyphenylene ether in a reaction medium containing solvated rubber and recovering the polymeric components from reaction medium in the form of a precipitate by admixture of said solution with a non-solvent precipitant. It should be noted that recovery of a polymer with a non-solvent is not uncommon in the art and such procedures have heretofore been employed for the recovery of a substantially pure polyphenylene ether by precipitation with an alcoholic non-solvent such as methanol from a solution in a solvent such as benzene. The invention herein is the preparation and processing of the polyphenylene ether and rubber avoiding prior art problems such as nodular formation and the like.

With knowledge of the inventive concept and the polymers contemplated, the selection of suitable solvent and non-solvent combinations should be obvious to one skilled in the art and suitable solvents and non-solvents can be readily ascertained by reference to standard handbooks and by routine experimentation. In general, the solvent should be a good solvent for the polyphenylene ether though it need only be a fair solvent for the rubber, incomplete dissolution of the rubber being satisfactory. Preferred solvents for purposes of this invention are the monocyclic aromatic solvents such as benzene, toluene, xylene and the halogenated forms thereof such as dichlorobenzene. Other good solvents are halogenated aliphatic solvents such as trichloroethylene and perchloroethylene. Good non-solvents for both the polyphenylene ethers and most rubbers generally include alcohols such as methyl alcohol, ethyl alcohol, isopropyl alcohol, n-propyl alcohol, n-butyl alcohol, sec-butyl alcohol and methylisobutyl carbonyl:esters such as ethylacetate, isopropylacetate, n-butylacetate, sec-butylacetate, amyl acetate, methylamyl acetate, hexyl acetate, ethylene glycol monomethyl ether acetate, ethylene glycol monoethyl ether acetate, and ethylene glycol monobutyl ether acetate; glycol ethers such as ethylene glycol monomethyl ether, ethylene glycol monobutyl ether, diethylene glycol monomethyl ether, diethylene glycol monoethyl ether, and diethylene glycol monobutyl ether.

Most preferred solvents are the aromatic solvents, especially the monocyclic hydrocarbon solvents such as benzene and toluene. Most preferred non-solvents are the alcohols, especially the aliphatic alcohols having from 1 to 4 carbon atoms such as methanol and ethanol.

It should be obvious that though the above solvents and non-solvents have been set forth as generally suitable for purposes of illustration, there may be various combinations of polyphenylene ethers and specific rubbers for which one or more of the aforesaid solvents and non-solvents would not be appropriate, and that the choice of a specific solvent or non-solvent would depend upon the specific polymers used.

In carrying out the process of the invention, the concentration of the polyphenylene ether and the rubber in the solvent prior to precipitation is not critical. Generally, they may be contained in solution in an amount up to solubility limits of the particular solvent used. Preferably, a reaction medium containing from about 10 to 30% by weight polymer components is preferred.

The polyphenylene ether and rubber is recovered from solution by admixture with a non-solvent for the materials. This is desirably accomplished by slowly adding the reaction medium containing the polyphenylene ether and rubber to the non-solvent with recovery of the precipitate as it forms. To obtain a uniform powder having a relatively small particle size, the non-solvent is preferably agitated by a high speed stirrer during the addition of the solution to the non-solvent.

Recovery of the precipitate from the non-solvent is in accord with art recognized practices such as by filtration or centrifugation. Following recovery, the powders are dried and molded to any desired shape using standard molding procedures. For example, the powders can be passed through an extruder and chopped into pellets for subsequent molding. Alternatively, the powders can be molded directly to any desired shape. The specific forming procedure used does not constitute a part of this invention.

As noted above, the solution of the polyphenylene ether and rubber is provided by solvating the rubber and adding a monomeric phenolic precursor of the polyphenylene ether to the solution followed by in situ polymerization. Procedures for the polymerization of phenols to high molecular weight polyphenylene ethers are known in the art and described in the aforementioned patents of Hay and Stamatoff.

The preferred method for polymerizing the phenolic precursor to a high molecular weight polyphenylene ether involves the oxidative coupling of the phenol in the presence of a copper-amine complex catalyst as described in the aforesaid patents of Hay Nos. 3,306,874 and 3,306,875 incorporated herein by reference. In general, the method, modified in accordance with the present invention, comprises passing an oxygen containing gas through a mixture of one or more phenolic monomers dissolved in a solution also containing dissolved complex catalyst formed from at least one copper salt and at least one amine along with the rubber and other desired additives. Details regarding the polymerization reaction, the catalyst components and additional suitable solvents for the polymerization reaction can be found in the above-referenced Hay patents incorporated herein by reference.

It should be noted that the presence of the rubber in the polymerization system does not adversely affect the formation of the polyphenylene ether.

Though not wishing to be bound by theory, it is speculated that the in situ polymerization of the phenol in the solution containing the rubber may result in some grafting or co-reaction between the rubber and the polyphenylene ether formed thus resulting in a product that would differ from a powder blend obtained by precipitation of a solution formed by simply dissolving pre-formed polyphenylene ether and rubber in a common solvent.

When the solution of the polyphenylene ether and rubber is provided by the in situ polymerization of the phenolic precursor as described above, due to the presence of reaction components, by-products and other impurities, it may be desirable to add an additional step of purification of the resultant polymer products such as by re-dissolving in a solvent and re-precipitating with non-solvent.

The procedures of the subject invention will be better understood by reference to the following examples:

EXAMPLE 1

To a tube type reaction vessel equipped with a Vibro-Mixer stirrer, thermometer and an oxygen inlet tube were added 140 ml. of toluene solution containing 2 gm. of cis-polyisoprene identified as Ameripol SN–600 of the B. F. Goodrich Company, 1.68 ml. of di-n-butylamine and 0.144 gm. of cuprous bromide. The solution was mixed and 10 gm. of 2,6-dimethylphenol were added. Oxygen was passed through the stirred reaction mixture for 120 minutes while the reaction temperature was maintained at 25° C. Polymerization was terminated by addition of 4 ml. of a 50% aqueous acetic acid solution. The acid layer was removed by centrifugation and the polymer precipitated with methanol. The precipitate comprising a finely divided, poly-(2,6-dimethyl-1,4-phenylene) ether and cis-polyisoprene product was reslurried in methanol, filtered and vacuum dried yielding 10.8 gm. of a resinous composition which was a white, free flowing powder having an intrinsic viscosity in chloroform at 25° C. of 0.68 deciliter per gram. A compression molded film prepared from this resinous composition was tough and flexible.

EXAMPLE 2

A solution was prepared comprising 0.5 gm. of cis-polyisoprene dissolved in 140 ml. of toluene. The procedures of Example 1 were repeated to polymerize 10 gm. of 2,6-dimethylphenol in the toluene solution. There was obtained 9.6 gm. of a resinous composition which was a free-flowing, white powder. Compression molded film prepared from this material was tough and flexible.

EXAMPLE 3

A solution was prepared comprising 2.0 gm. of an A-B-A block copolymer (where A is styrene and B is butadiene) dissolved in 140 ml. of toluene. The polymerization reaction components of Example 2 were added to the toluene solution and the polymerization reaction carried out as in Example 1. There was obtained 10.9 gm. of a resinous composition which was a white, free-flowing powder comprising the poly-(2,6-dimethyl-1,4-phenylene) ether and the block styrene butadiene copolymer. A compression molded film from this mixture was clear, tough and flexible.

EXAMPLE 4

A solution was prepared comprising 10 gm. of a polystyrene identified as Dylene 8 of Koppers Chemical Company, and 0.5 gm. of the cis-polyisoprene of Example 1 in 140 ml. of toluene. The polymerization reaction components of Example 1 were added to the solution and the polymerization reaction performed as described in Example 1. There was obtained about 19 gm. of a resinous composition which was a white, free-flowing powder of poly-(2,6-dimethyl-1,4-phenylene) ether, polystyrene and cis-polyisoprene. A compression molded film formed from this resinous composition was clear and almost colorless.

EXAMPLE 5

Into a 5 liter three necked flask equipped with a dropping funnel, thermometer, stirrer and oxygen inlet tube were added 3000 ml. of toluene solution containing 30 gm. of polybutadiene identified as Solprene 203 of Phillips Petroleum Company, 50.4 ml. on di-n-butyl amine and 4.32 gm. of cuprous bromide. Oxygen was passed through the stirred reaction mixture at a rate of 4 s.c.f.h. A solution of 300 gm. of 2,6-dimethylphenol in 300 gm. of toluene was added dropwise over a 30 minute interval while maintaining the temperature between 25–30° C. The reaction was continued for 90 minutes after the completion of the addition of 2,6-dimethylphenol and terminated by the addition of 100 ml. of 50 % aqueous acetic acid solution. The acid layer was removed by centrifugation and the polymers were precipitated with methanol. The precipitate was suction filtered, reslurried in methanol, filtered and vacuum dried, yielding 304 gm. of a free flowing powder.

Two pounds of the rubber modified polyphenylene oxide polymer prepared by the procedure of this Example 5 were extruded through a single screw extruder at a temperature of 590° F. The emerging strands were cooled and chopped into pellets and molded into test bars using standard procedures. The following physical properties were obtained:

| | |
|---|---|
| Izod impact (ft. lbs./in. notch) | 8.7 |
| Deflection temperature (264 p.s.i.), ° C. | 180 |
| Elongation fail, percent | 68 |
| Tensile fail, p.s.i. | 9500 |

EXAMPLE 6

The same procedure was used as in Example 5; however, 25 gms. of polybutadiene identified as Solprene 203 of Phillips Petroleum Company were dissolved in toluene solution.

Two pounds of the rubber modified polyphenylene oxide polymer prepared by the procedure of Example 6 were extruded through a single screw extruder at a temperature of 590° F. The emerging strands were cooled and chopped into pellets and molded into test bars using standard procedures. The following physical properties were obtained:

| | |
|---|---|
| Izod impact (ft. lbs./in. notch) | 6.6 |
| Deflection temperature (264 p.s.i.), ° C. | 182 |
| Elongation fail, percent | 58 |
| Tensile fail, p.s.i. | 9200 |

EXAMPLE 7

Into a 5 liter three necked flask equipped with a dropping funnel, thermometer, stirrer and oxygen inlet tube were added 3000 ml. of benzene solution containing 36 gm. of polybutadiene identified as Solprene 203 of Phillips Petroleum Company, 300 gm. of polystyrene identified as Dylene 8 of Koppers Chemical Company, 50.4 ml. of di-n-butyl amine and 4.32 gm. of cuprous bromide. Oxygen was passed through the stirred reaction mixture at a rate of 4 s.c.f.h. A solution of 300 gm. of 2,6-dimethylphenol in 300 gm. of benzene was added dropwise over a 25–30 minute interval while maintaining the temperature between 25–30° C. The reaction was continued for 120 minutes after the completion of the addition of 2,6-dimethylphenol and terminated by the addition of 100 ml. of 50% aqueous acetic acid solution. The acid layer was removed by centrifugation and the polymers were precipitated in methanol. The precipitate was suction filtered, reslurried in methanol, filtered and vacuum dried yielding 607 gm. of a free flowing white powder.

Three pounds of polymer obtained by the polymerization procedure described in Example 7 were extruded through a single screw extruder at a temperature of 560° F. The emerging strands were cooled, chopped into pellets and molded into test bars using standard procedures. The following physical properties were obtained:

| | |
|---|---|
| Izod impact (ft. lbs./in. notch) | 3.74 |
| Deflection temperature (264 p.s.i.), ° C. | 127 |
| Elongation fail, percent | 49 |
| Tensile fail, p.s.i. | 7400 |

EXAMPLE 8

The procedure used in Example 5 was repeeated with the exception that the 3000 ml. of toluene added to the reactor contained 300 gm. of rubber modified polystyrene identified as 825–TV of the Cosden Oil and Chemical Company, 50.4 ml. of di-n-butyl amine and 4.32 gm. of cuprous bromide. There was obtained 575 gms. of a free flowing polymeric composition.

Two pounds of the polymeric composition produced by Example 8 were extruded and molded into test specimens. The following physical properties were obtained:

| | |
|---|---|
| Izod impact (ft. lbs./in. notch) | 2.7 |
| Deflection temperature (264 p.s.i.), ° F. | 280 |
| Elongation fail, percent | 39 |
| Tensile strength, p.s.i.: | |
| Ultimate | 8,600 |
| Yield | 10,700 |

EXAMPLE 9

The procedure used in Example 5 was repeated with the exception that 34 gm. of a styrene-butadiene copolymer identified as 1006 Shell Chemical Company was dissolved in toluene. With precipitation and drying, 310 gm. of a free flowing white resinous composition was obtained which was molded into test specimens. The following physical properties were obtained:

| | |
|---|---|
| Izod impact (ft. lbs./in. notch) | 6.4 |
| Deflection temperature (264 p.s.i.), ° C. | 179 |
| Elongation fail, percent | 51 |
| Tensile fail, p.s.i. | 8900 |

EXAMPLE 10

The procedure of Example 5 was repeated with the exclusion of the 30 gms. of polybutadiene. There were obtained 280 gms. of poly(2,6-dimethylphenylene) ether having an intrinsic viscosity of 0.49 dl./g. in chloroform at 25° C. Then, 1000 gms. of polymer obtained by the procedure described in Example 10 were extruded in a single screw extruder and the resulting pellets molded into test bars using standard procedures. The following physical properties were obtained:

| | |
|---|---|
| Izod impact (ft. lbs./in notch) | 1.1 |
| Deflection temperature (264 p.s.i.), ° F. | 375 |
| Elongation fail, percent | 35 |
| Tensile strength, p.s.i.: | |
| Ultimate | 9,500 |
| Yield | 10,800 |

It should be understood that the invention contemplates additional methods for forming mixtures of polymers in addition to that noted above. For example, the powders of polyphenylene ether and rubber, subsequent to recovery can be blended physically with an additional polymer component such as a polystyrene.

I claim:

1. A method for preparing a free-flowing powder composition comprising a polyphenylene ether and a rubber, said method comprising the steps of polymerizing a monomeric phene to a high molecular weight polyphenylene ether in admixture with up to 30% by weight of a diene rubber in a reaction medium comprising a solvent for said rubber and recovering polymeric components from the reaction mixture by admixing the reaction medium containing said polymeric components with a non-solvent for said polyphenylene ether and said rubber.

2. The method of claim 1 where said monomeric phenol is 2,6-dimethylphenol.

3. The method of claim 1 where said polymerization is by an oxidative coupling reaction in the presence of a copper-amine complex catalyst.

4. The method of claim 2 where said rubber is a polybutadiene.

5. The method of claim 2 where subsequent to polymerization, the polyphenylene ether is in the reaction mixture in an amount in excess of the rubber.

6. The method of claim 2 where a polystyrene is also dissolved in the reaction mixture prior to recovery of said polymeric components.

7. The method of claim 2 where said reaction mixture is in a solvent selected from the group of aromatic monocyclic hydrocarbons and halogenated derivatives thereof.

8. The method of claim 7 where said solvent is selected from the group of benzene and toluene.

9. The method of claim 2 where said non-solvent is selected from the group of alcohols, esters and glycol ethers.

10. The method of claim 9 where said non-solvent is an alcohol.

11. The method of claim 9 where said non-solvent is methanol.

12. A process for preparing a free-flowing powder composition comprising a poly-(2,6-dimethyl-1,4-phenylene)ether and a polybutadiene, said method comprising the steps of polymerizing a major weight proportion of 2,6-dimethylphenol to a high molecular weight polyphenylene ether having at least 100 repeating units in admixture with up to 30% by weight of a polybutadiene rubber by an oxidative coupling polymerizing reaction in the presence of a copper-amine complex catalyst, said polymerization being in a reaction medium comprising a monocyclic aromatic solvent for said rubber, and recovering polymeric components by admixing the reaction medium containing said polymeric components with an alcoholic non-solvent precipitant for said polyphenylene ether and said polybutadiene.

13. The process of claim 12 where the polystyrene is also dissolved in said reaction medium prior to recovery with said alcohol.

14. The process of claim 13 where the polystyrene is a high impact polystyrene.

15. A process for preparing a free-flowing powder composition comprising a poly(2,6-dimethyl-1,4-phenylene) ether and a polybutadiene, said method comprising the polymerizing of 2,6-dimethyl phenol to a high molecular weight polyphenylene ether having at least 100 repeating units in admixture with a polybutadiene rubber by an oxidative coupling polymerization reaction in the presence of a copper-amine complex catalyst, said polymerization being in a reaction medium comprising a monocyclic aromatic solvent for said rubber, and recovering polymeric components by admixing the reaction medium containing said polymeric components with an alcoholic non-solvent precipitant for said polyphenylene ether and said polybutadiene, a high impact polystyrene being also dissolved in said reaction medium prior to recovery with the alcohol, and wherein the reaction medium prior to recovery comprises said polyphenylene ether in an amount of from 20 to 50%, the high impact polystyrene in an amount of from 30 to 50% and the polybutadiene in an amount of from 5 to 20%, all percentages being by weight.

16. The process of claim 12 where the monocyclic aromatic solvent is benzene or toluene.

17. The process of claim 12 where the lower alcohol non-solvent is methanol.

18. A free-flowing powder of a polyphenylene ether polymerized in the presence of a diene rubber by the method of claim 1.

19. A free-flowing powder of a polyphenylene ether polymerized in the presence of a diene rubber by the method of claim 11.

20. A free-flowing powder of a polyphenylene ether polymerized in the presence of a polybutadiene rubber by the method of claim 14.

References Cited

UNITED STATES PATENTS

| | | | |
|---|---|---|---|
| 3,383,340 | 5/1968 | MacCallum et al. | 260—3 |
| 3,383,435 | 5/1968 | Sizek | 260—874 |

MURRAY TILLMAN, Primary Examiner

C. SECCURO, Assistant Examiner

U.S. Cl. X.R.

260—33.2 R, 33.4 R, 33.6 A, 33.6 UA, 33.8 R, 33.8 UA, 874, 876 B, 876 R, 890, 887, 893, 894, 896, 897 R, 901